(12) United States Patent
Smeeton

(10) Patent No.: US 12,498,566 B2
(45) Date of Patent: Dec. 16, 2025

(54) HEAD-UP DISPLAY

(71) Applicant: Envisics Ltd, Milton Keynes (GB)

(72) Inventor: Timothy Smeeton, Milton Keynes (GB)

(73) Assignee: Envisics Ltd., Milton Keynes (GB)

(*) Notice: Subject to any disclaimer, the term of this patent is extended or adjusted under 35 U.S.C. 154(b) by 393 days.

(21) Appl. No.: 18/297,893

(22) Filed: Apr. 10, 2023

(65) Prior Publication Data

US 2023/0359027 A1    Nov. 9, 2023

(30) Foreign Application Priority Data

May 5, 2022  (GB) ..................................... 2206538

(51) Int. Cl.
*G02B 27/01* (2006.01)

(52) U.S. Cl.
CPC ..... *G02B 27/0101* (2013.01); *G02B 27/0103* (2013.01); *G02B 2027/0187* (2013.01)

(58) Field of Classification Search
CPC ............ G02B 27/0101; G02B 27/0103; G02B 2027/0187; G02B 27/0172; G02B 27/0109; G02B 27/011; G02B 27/014
USPC .......................................................... 359/13
See application file for complete search history.

(56) References Cited

U.S. PATENT DOCUMENTS

| | | | |
|---|---|---|---|
| 2015/0346491 A1* | 12/2015 | Christmas | G03H 1/0841 |
| 2016/0048018 A1* | 2/2016 | De Matos Pereira Vieira | H04N 13/344 359/13 |
| 2019/0287495 A1 | 9/2019 | Mathur et al. | |
| 2021/0191319 A1 | 6/2021 | Christmas | |
| 2021/0373330 A1* | 12/2021 | Urey | G02B 25/001 |
| 2022/0187601 A1* | 6/2022 | Morozov | B60K 35/80 |

FOREIGN PATENT DOCUMENTS

| | | | | |
|---|---|---|---|---|
| EP | 3961353 A1 | | 3/2022 | |
| GB | 2101666.2 | * | 2/2021 | ............ G02B 27/01 |
| KR | 10-2021-0068983 A | | 6/2021 | |
| KR | 10-2021-0125071 A | | 10/2021 | |

(Continued)

OTHER PUBLICATIONS

Search and Examination Report issued in application GB 2206538.7 dated Nov. 2, 2022 (6 pages).

(Continued)

*Primary Examiner* — Stephone B Allen
*Assistant Examiner* — Boutsikaris Leonidas
(74) *Attorney, Agent, or Firm* — Akerman LLP

(57) ABSTRACT

Disclosed embodiments include a display system comprising an eye-box from which virtual images formed by the display system are visible. In some embodiments, the display system includes an image projector arranged to project a virtual image at a virtual image distance from the eye-box, and a user-tracking system arranged to determine an eye-box position of a user within the eye-box and a confidence value associated with the determined eye-box position. In some embodiments, the image projector is arranged to (i) project the virtual image at a finite virtual image distance after determining that the confidence value is above a threshold value and (ii) project the virtual image at an infinite virtual image distance after determining that the confidence value is below the threshold value.

20 Claims, 7 Drawing Sheets

(56) References Cited

FOREIGN PATENT DOCUMENTS

KR    2021 0125071 A    10/2021
WO    WO 2012131937 A1    4/2012

OTHER PUBLICATIONS

Office Action issued on Jan. 8, 2025 in Application KR 10-2023-0056646 (7 pages).
English translation of Office Action issued on Jan. 8, 2025 in Application KR 10-2023-0056646 (7 pages).
Extended European Search Report issued on 04-Oct. 2023 in Application EP 23168395.4 (8 pages).

* cited by examiner

HEAD-UP DISPLAY

CROSS-REFERENCE TO RELATED APPLICATIONS

This application claims priority under 35 U.S.C. § 119 to UK Patent Application GB 2206538.7 titled "Head-Up Display," filed on May 5, 2022, and currently pending. The entire contents of GB 2206538.7 are incorporated by reference herein for all purposes.

FIELD

The present disclosure relates to a display system, a method of display and a holographic projector. More specifically, the present disclosure relates a display system comprising a waveguide pupil expander or replicator, a method of display using a waveguide for pupil expansion or pupil replication and a holographic projector in which the hologram compensates for the shape of an optical component of the display system. Some embodiments relate to picture generating unit and a head-up display, for example an automotive head-up display (HUD).

Introduction

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

In a first aspect, there is disclosed herein a display system. The display system has an eye-box or viewing window from within which image content formed by the display system can be seen. The person skilled in the art of projection will be familiar with the idea of a head-up display having an eye-box. The images are virtual images and the eye-box is therefore an area or volume from which virtual images formed by the display system are visible. The display system comprises an image projector and a user-tracking system such as an eye-tracking system. The image projector is arranged to project a virtual image at a virtual image distance from the eye-box. In some embodiments shown in the drawings, the image projector is arranged to project a first virtual image at a first virtual image distance and project a second virtual image at a second virtual image distance different to the first virtual image distance. The user-tracking system is arranged to try and determine an eye-box position of a user within the eye-box. The user-tracking system is further arranged to determine a corresponding confidence value or level associated with the determination (a confidence level associated with the determined eye-box position). In some embodiments, the image projector is arranged to project the virtual image at a finite virtual image distance if the confidence value is above a threshold value. The image projector is further arranged to project the virtual image at an infinite virtual image distance if the confidence value is below the threshold value. In some embodiments, the image projector is arranged to project the virtual image at a plurality of virtual image distances if the if the confidence values is above a threshold. In other words, when the confidence value is above a threshold, the image projector may be arranged to display content at plurality of virtual image depths/on a plurality of replay planes. The image projector may further be arranged to project the virtual image at a single virtual image depth/on a single replay plane (e.g. at infinity) if the confidence value is below the threshold value.

Holographic head-up display in accordance with the present disclosure uses eye-tracking to measure positions of driver's eyes and this eye position data is used for compute of the hologram. Eye-tracking software has varying degrees of confidence in the results it is reporting (e.g. 0% if no eye measured; 100% if maximum confidence in the reported result). Eye-tracking can be unreliable at times, for example immediately after the head is brought into the eye-box such as after looking over shoulder to check blind-spot while driving.

In some embodiments, eye-position is used in a hologram compute process to ensure correct light is delivered through a pupil expander (e.g. correct light from each replica) and/or to ensure correct windshield compensation is applied based on the patch of the windshield that light reflects off for given eye position.

The inventor has found that eye positions are most critical when displaying multiple plane or 3D content with finite virtual image depths (VIDs). In this case the head-up display may be configured to use the eye positions to compute bespoke holograms which deliver bespoke light (through pupil expander) to the left and right eyes for full 3D perception. This requires good precision in the eye position measurements.

It was found that eye positions are not as important for displaying content which has infinite VID. In this case the head-up display can operate without any eye tracking data. For a real-world vehicle windshield, some data on eye position is needed to correct for distortion in the image but the tolerance on eye position is much more relaxed than for 3D holograms. For example a cyclops eye measurement (midpoint between eyes) may be acceptable.

It is anticipated that at some times the eye tracking system in a car will not have complete confidence in the position of one or both of the eyes (e.g. after looking over shoulder). The eye tracking software may report a confidence value, for example one confidence value for each eye.

In accordance with this disclosure, when the confidence in eye tracking measurement is below a threshold value the display system computes and displays an hologram with infinite virtual image depth rather than the full multi-plane or 3D image that is usually displayed. This ensures continuity of experience for the driver even when the eye tracking confidence is lost.

The image projector may be a holographic projector. The holographic projector may comprise a spatial light modulator arranged to display a hologram of the virtual image and spatially modulate light in accordance with the hologram. The virtual image distance may be encoded in the hologram.

The hologram may be a computer-generated hologram calculated by a hologram engine of the display system. The hologram may be based on the determined eye-box position. Accordingly, the accuracy of the determined user position affects the accuracy of the hologram and therefore the image quality of the holographic reconstruction. In some embodiments, the hologram calculation is based on the determined eye-box position even when the image projector is arranged to project the virtual image at an infinite image distance (as well as when the image projector is arranged to project the virtual image at a finite image distance). As explained above, an eye-box position with a high confidence value associated (e.g. above the threshold) may be critical for displaying multiple plane or 3D content with finite VIDs but a determined eye-box position with a low confidence value associated (e.g. below the threshold) may still be useful in the calculation of a hologram. For example, as explained in more detail below, the determined eye-box position may be useful for correcting for distortion caused by the optical combiner or to determine an aperture in the display system. This, it may be advantageous to base the hologram calculation on the determined eye-box position even if associated confidence is below the threshold. In some embodiments, the determined eye-box position on which the hologram calculation is based has an associated confidence value that is below the threshold value, optionally greater than zero.

The determined eye-box position may be used to determine a sub-area of an optical combiner used to form the virtual image. The determined eye-box position may be used to determine a sub-area of an optical combiner used to form the virtual image both when the image projector is arranged to project the virtual image at a finite virtual image distance and when the image projector is arranged to project the virtual image at an infinite virtual image distance. The optical combiner may be a window, such as the windscreen of a vehicle, used to form the virtual image. The hologram engine may be arranged to compensate for the shape of the optical combiner in the sub-area during hologram calculation. The present disclosure is particularly effective when the optical combiner has a complex curvature such as found with vehicle windscreens. In these embodiments, using the hologram to compensate for the shape of the optical combiner, the inventor found that a sensitivity to eye-position accuracy was significantly reduced when the virtual image distance was at infinity. Thus, the determined eye-box position may advantageously be used even when the confidence in the determined eye-box position is low (below the threshold). The improved system and method of the present disclosure is therefore particularly synergistic with embodiments in which the (calculated) hologram compensates for the shape of an optical combiner used to form the virtual image/s.

The determined eye-box position may be used to determine the position of an aperture in the display system. The determined eye-box position may be used to determine the position of an aperture in the display system both when the image projector is arranged to projector the virtual image at a finite virtual image distance and when the image projector is arranged to project the virtual image at an infinite virtual image distance. The hologram engine is arranged to exclude from the hologram calculation the contribution of light blocked by the aperture. The reader of the detailed description that follows will understand, and the corresponding incorporations by reference in relation to first to third hologram calculation methods, that the aperture is not a physical object in the display system but, instead, a virtual aperture used to limit or restrict the hologram calculation in order to improve image quality. The position of the virtual aperture is fundamentally dependent on a user position measurement. The inventor found a reduced sensitivity to user position in these methods when the virtual image distance was infinite. Thus, the determined eye-box position may advantageously be used even when the confidence in the determined eye-box position is low (below the threshold). The improved system and method of the present disclosure is therefore particularly synergistic with embodiments in which the determined eye-box position is used to determine the position of a virtual aperture in the display system during hologram calculation.

In some embodiments, the hologram is configured to angularly distribute spatially modulated light of the image in accordance with position of image content, such that angular channels of the spatially modulated light correspond with respective continuous regions of the image. The holographic projector may further comprise at least one waveguide pupil expander arranged to form an array of replicas of the hologram. The holographic projector may further comprise a control device arranged to control the delivery of angular channels to the eye-box position. The reader of the detailed description that follows, and the corresponding incorporation by reference in relation to the control device, will understand that the optical configuration (or "state") of the control device is fundamentally based upon the eye-box position of the user. The inventor found that the sensitivity of the light control system to eye-box position was reduced when an infinite virtual image distance was used. Thus, the determined eye-box position may advantageously be used even when the confidence in the determined eye-box position is low (below the threshold). The improved system and method of the present disclosure is therefore particularly synergistic with embodiments in which the a light control device is used to control the delivery of light channels from the light channeling hologram in accordance with embodiments.

The user-tracking system may be arranged to repeatedly or continually determine the eye-box position of a user during display of the virtual images. The reader will appreciate how the process of determining an eye-box position of the user is on-going process because of the fundamental importance of this information to the display system.

The image projector may be arranged to transition from projection at an infinite virtual image distance to projection at a finite virtual image distance in response to the confidence level increasing above the threshold. This transition may comprise projecting at an intermediate virtual image distance. When transitioning back from infinite image mode to normal multiplane image mode (i.e. after eye tracking confidence has been established) the image depths may be adjusted smoothly to the usual values. Most general implementation is that there is eye-position tolerant mode (i.e. not necessarily the infinite VID) that is delivered when eye tracking confidence is low.

The confidence value may be zero if no eye-box position can be established. The threshold value may be greater than zero. In summary, the system and method of the present disclosure ensure a continuous viewing experience for driver and enable use of the head-up display for safety-critical information which must always be delivered.

In a second aspect, there is provided a method of display. The method comprises the step of projecting a virtual image at a virtual image distance from an eye-box. The method further comprises determining an eye-box position of a user within the eye-box and a confidence value associated with determination of the eye-box position. The method further comprises projecting the virtual image at a finite virtual image distance if the confidence value is above a threshold value. The method further comprises projecting the virtual image at an infinite virtual image distance if the confidence value is below the threshold value.

In some embodiments, the method further comprises calculating a hologram of the virtual image. The method may further comprise displaying the hologram on a spatial light modulator. The method may further comprise spatially modulating light in accordance with the hologram. The virtual image distance may be encoded in the hologram.

In some embodiments, the step of calculating the hologram is based on the eye-box position. The calculation of the hologram may be based on the determined eye-box position when the image projector is arranged to project the virtual image at an infinite image distance. The determined eye-box position may have an associated confidence value that is below the threshold value, optionally greater than zero In some embodiments, the step of calculating the hologram comprises determining a sub-area of an optical combiner used to form the virtual image using the determined eye-box position; and compensating for the shape of the optical combiner in the sub-area during hologram calculation. In some embodiments, the further comprises determining the position of an aperture in the display system; and excluding the contribution of light ray paths blocked by the virtual aperture from the hologram calculation.

In some embodiments, the hologram is configured to angularly distribute spatially modulated light of the image in accordance with position of image content, such that angular channels of the spatially modulated light correspond with respective continuous regions of the image, wherein the holographic projector further comprises at least one waveguide pupil expander arranged to form an array of replicas of the hologram (and therefore an array of replicas of the angular channels), and the method further comprises:
  controlling the delivery of angular channels to the eye-box position (e.g. allow some angular channels to propagation to the eye-box and block others) using a control device.

In a third aspect, there is a provided a method of display comprising determining an eye-box position of a user within the eye-box and a confidence value associated with determination of the eye-box position. The method further comprises projecting a virtual image at a virtual image distance. The virtual image is projected at a finite virtual image distance if the confidence value is above a threshold value. The virtual image is projected at an infinite virtual image distance if the confidence value is below the threshold value.

Features and advantages disclosed in relation to one aspect may be applied to the other aspects. In particular, features and advantages described in relation to the first aspect may be applicable to the second and third aspects, and vice versa.

In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

A "diffracted light field" or "diffractive light field" in accordance with this disclosure is a light field formed by diffraction. A diffracted light field may be formed by illuminating a corresponding diffractive pattern.

In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Conventional Optical Configuration for Holographic Projection

Figure 1:
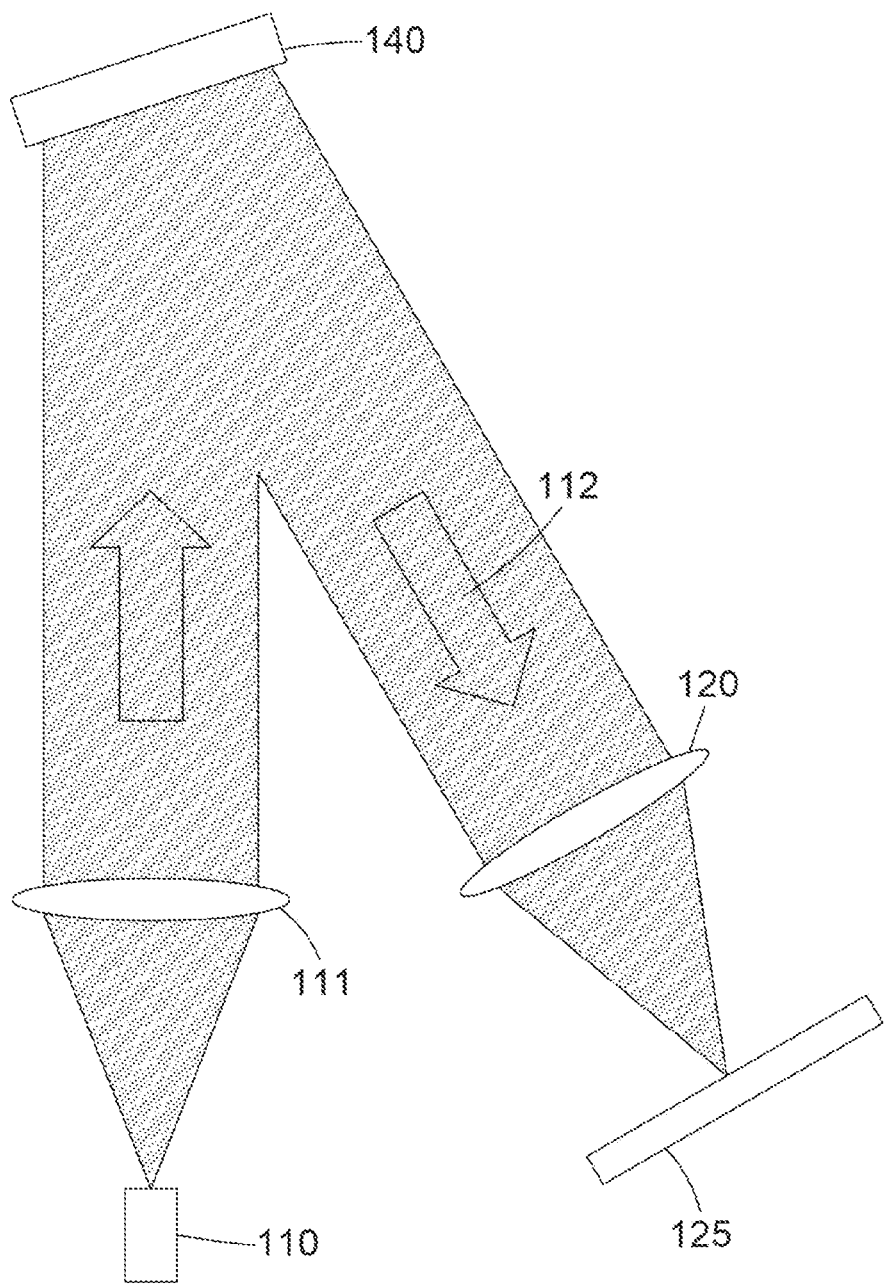
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods.

As explained in the Summary, the new teachings of the present disclosure are effective with so-called direct view holography (in which a hologram rather than an image is delivered directly to the viewer) and particularly synergistic with hologram calculation methods that determine the size and location of a virtual aperture in the optical system based on an eye-box position of the user in order to improve performance. Three examples are provided in the detailed description below by incorporation by reference. These methods are not repeated herein in full because the specifics of the algorithms are not essential to the concept disclosed herein and are merely exemplary of approaches that significantly benefit from the teachings of the present disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Light Modulation

The display system comprises a display device defining the exit pupil of the display system. The display device is a spatial light modulator. The spatial light modulation may be a phase modulator. The display device may be a liquid crystal on silicon, "LCOS", spatial light modulator.

Display System Using Small Display Device

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other embodiments, the image is a real image formed by holographic reconstruction and the image is projected or relayed to the viewing plane. The image is formed by illuminating a diffractive pattern (e.g., hologram) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some examples, an image (formed from the displayed hologram) is propagated to the eyes. For example, spatially modulated light of an intermediate holographic reconstruction/image formed either in free space or on a screen or other light receiving surface between the display device and the viewer, may be propagated to the viewer.

In some other examples, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-motion box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels). Embodiments of the present disclosure relate to a configuration in which a hologram of an image is propagated to the human eye rather than the image itself. In other words, the light received by the viewer is modulated according to a hologram of the image. However, other embodiments of the present disclosure may relate to configurations in which the image is propagated to the human eye rather than the hologram—for example, by so called indirect view, in which light of a holographic reconstruction or "replay image" formed on a screen (or even in free space) is propagated to the human eye.

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure relates to non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window—e.g., eye-box or eye motion box for viewing by the viewer. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The hologram may be represented, such as displayed, on a display device such as a spatial light modulator. When displayed on an appropriate display device, the hologram may spatially modulate light transformable by a viewing system into the image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram is described herein as routing light into a plurality of hologram channels merely to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be arbitrarily divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels. However, in some arrangements, a plurality of spatially separated hologram channels is formed by intentionally leaving areas of the target image, from which the hologram is calculated, blank or empty (i.e., no image content is present).

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

Broadly, a system is disclosed herein that provides pupil expansion for an input light field, wherein the input light field is a diffracted or holographic light field comprising diverging ray bundles. As discussed above, pupil expansion (which may also be referred to as "image replication" or "replication" or "pupil replication") enables the size of the area at/from which a viewer can see an image (or, can receive light of a hologram, which the viewer's eye forms an image) to be increased, by creating one or more replicas of an input light ray (or ray bundle). The pupil expansion can be provided in one or more dimensions. For example, two-dimensional pupil expansion can be provided, with each dimension being substantially orthogonal to the respective other.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffractive or diffracted light may be output by a display device such as a pixelated display device such as a spatial light modulator (SLM) arranged to display a diffractive structure such as a hologram. The diffracted light field may be defined by a "light cone". Thus, the size of the diffracted light field (as defined on a two-dimensional plane) increases with propagation distance from the corresponding diffractive structure (i.e. display device).

The spatial light modulator may be arranged to display a hologram. The diffracted or diverging light may comprise light encoded with/by the hologram, as opposed to being light of an image or of a holographic reconstruction. In such embodiments, it can therefore be said that the pupil expander replicates the hologram or forms at least one replica of the hologram, to convey that the light delivered to the viewer is spatially modulated in accordance with a hologram of an image, not the image itself. That is, a diffracted light field is propagated to the viewer.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

Light Channeling

The optical system disclosed herein is applicable to pupil expansion with any diffracted light field. In some embodiments, the diffracted light field is a holographic light field—that is, a complex light field that has been spatially modulated in accordance with a hologram of an image, not the image itself. In some embodiments, the hologram is a special type of hologram that angularly divides/channels the image content. This type of hologram is described further herein merely as an example of a diffracted light field that is compatible with the present disclosure. Other types of hologram may be used in conjunction with the display systems and light engines disclosed herein.

The hologram engine is arranged to exclude from the hologram calculation the contribution of light blocked by a limiting aperture of the display system. British patent application 2101666.2, filed 5 Feb. 2021 and incorporated herein by reference, discloses a first hologram calculation method in which eye-tracking and ray tracing are used to identify a sub-area of the display device for calculation of a point cloud hologram which eliminates ghost images. The sub-area of the display device corresponds with the aperture, of the present disclosure, and is used exclude light paths from the hologram calculation. British patent application 2112213.0, filed 26 Aug. 2021 and incorporated herein by reference, discloses a second method based on a modified Gerchberg-Saxton type algorithm which includes steps of light field cropping in accordance with pupils of the optical system during hologram calculation. The cropping of the light field corresponds with the determination of a limiting aperture of the present disclosure. British patent application 2118911.3, filed 23 Dec. 2021 and also incorporated herein by reference, discloses a third method of calculating a hologram which includes a step of determining a region of a so-called extended modulator formed by a hologram replicator. The region of the extended modulator is also an aperture in accordance with this disclosure.

A display system and method are described herebelow, which comprise a waveguide pupil expander. As will be familiar to the skilled reader, the waveguide may be configured as a 'pupil expander' because it can be used to increase the area over (or, within) which the light emitted by a relatively small light emitter—such as a relatively small SLM or other pixelated display device as used in the arrangements described herein—can be viewed by a human viewer or other viewing system that is located at a distance, such as a relatively large distance, away from the light emitter. The waveguide achieves this by increasing the number of transmission points from which the light is output, towards the viewer. As a result, the light may be seen from a plurality of different viewer locations and, for example, the viewer may be able to move their head, and therefore their line of sight, whilst still being able to see the light from the light emitter. Thus, it can be said that the viewer's 'eye-box' or 'eye-motion box' is enlarged, through use of a waveguide pupil expander. This has many useful applications, for example but not limited to head-up displays, for example but not limited to automotive head-up displays.

A display system as described herein may be configured to guide light, such as a diffracted light field, through a waveguide pupil expander in order to provide pupil expansion in at least one dimension, for example in two dimensions. The diffracted light field may comprise light output by a spatial light modulator (SLM), such as an LCOS SLM. For example, that diffracted light field may comprise light that is encoded by a hologram displayed by the SLM. For example, that diffracted light field may comprise light of a holographically reconstructed image, corresponding to a hologram displayed by the SL M. The hologram may comprise a computer-generated hologram (CGH) such as, but not limited to, a point-cloud hologram, a Fresnel hologram, or a Fourier hologram. The hologram may be referred to as being a 'diffractive structure' or a 'modulation pattern'. The SLM or other display device may be arranged to display a diffractive pattern (or, modulation pattern) that comprises the hologram and one or more other elements such as a software lens or diffraction grating, in a manner that will be familiar to the skilled reader.

The hologram may be calculated to provide channeling of the diffracted light field. This is described in detail in each of GB2101666.2, GB2101667.0, and GB2112213.0, all of which are incorporated by reference herein. In general terms, the hologram may be calculated to correspond to an image that is to be holographically reconstructed. That image, to which the hologram corresponds, may be referred to as an 'input image' or a 'target image'. The hologram may be calculated so that, when it is displayed on an SLM and suitably illuminated, it forms a light field (output by the SLM) that comprises a cone of spatially modulated light. In some embodiments the cone comprises a plurality of continuous light channels of spatially modulated light that correspond with respective continuous regions of the image. However, the present disclosure is not limited to a hologram of this type.

Although we refer to a 'hologram' or to a 'computer-generated hologram (CGH)' herein, it will be appreciated that an SLM may be configured to dynamically display a plurality of different holograms in succession or according to a sequence. The systems and methods described herein are applicable to the dynamic display of a plurality of different holograms.

Figure 2:
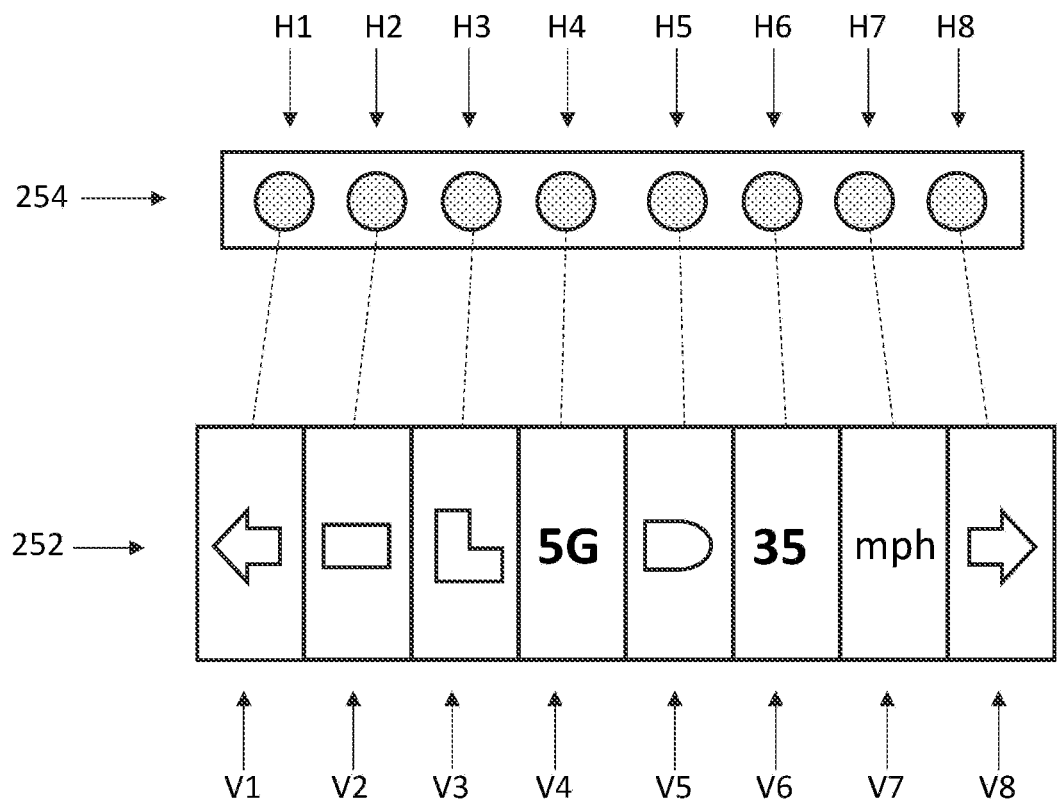
FIG. 2 shows an image for projection comprising eight image areas/components, V1 to V8, and cross-sections of the corresponding hologram channels, H1-H8.
Figure 3:
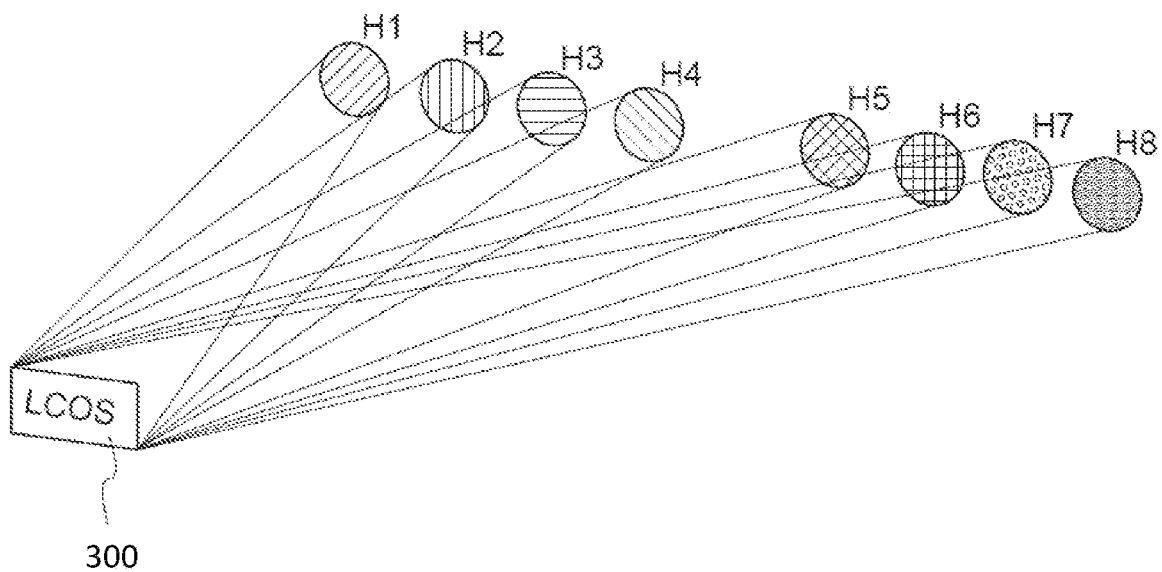
FIG. 3 shows a hologram displayed on an LCOS that directs light into a plurality of discrete areas.

FIGS. 2 and 3 show an example of a type of hologram that may be displayed on a display device such as an SLM, which can be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channeling of light that it performs. This is illustrated in FIG. 3. Specifically, the hologram in this example directs light into a plurality of discrete areas. The discrete areas are discs in the example shown but other shapes are envisaged. The size and shape of the optimum disc may, after propagation through the waveguide, be related to the size and shape of the entrance pupil of the viewing system.

Figure 4:
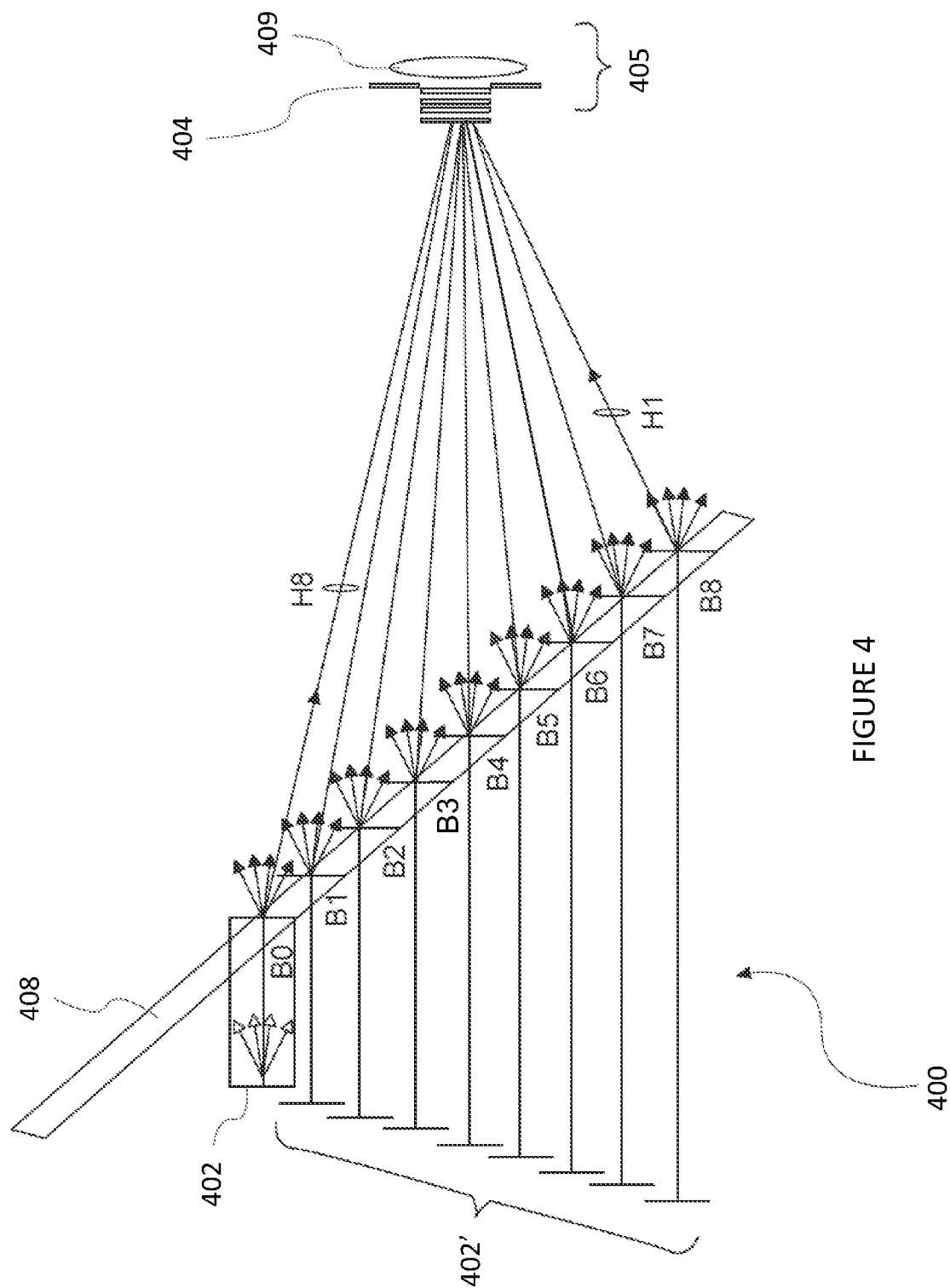
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 508 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

The methods and arrangements described above can be implemented in a variety of different applications and viewing systems. For example, they may be implemented in a head-up-display (HUD) or in a head or helmet mounted device (HMD) such as an Augmented Reality (AR) HMD. Although virtual images, which require the eye to transform received modulated light in order to form a perceived image, have generally been discussed herein, the methods and arrangements described herein can be applied to real images.

Two-Dimensional Pupil Expansion—Example 1

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

Figure 5:
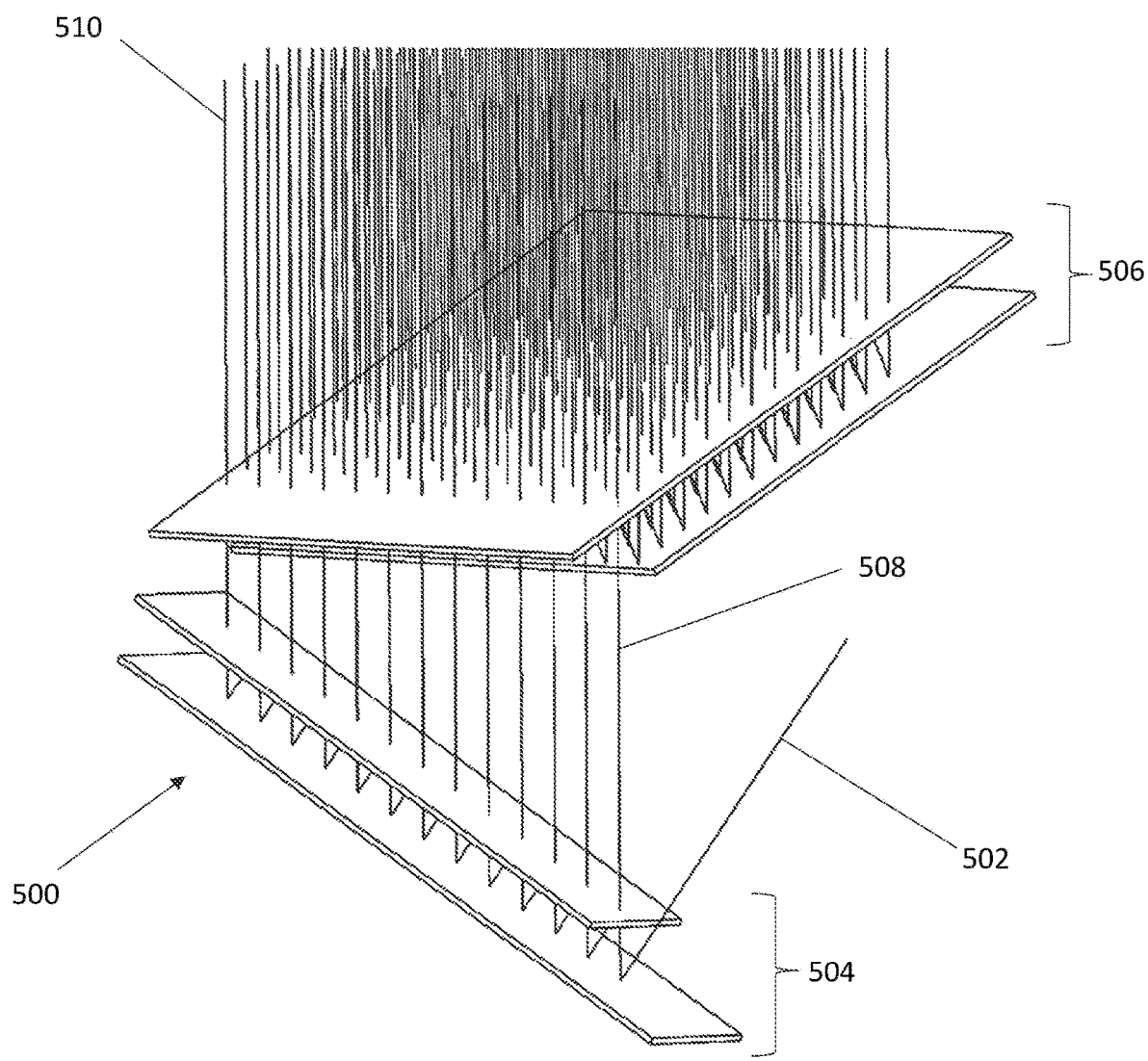
FIG. 5 shows a perspective view of a first example two-dimensional pupil expander comprising two replicators.
Figure 6:
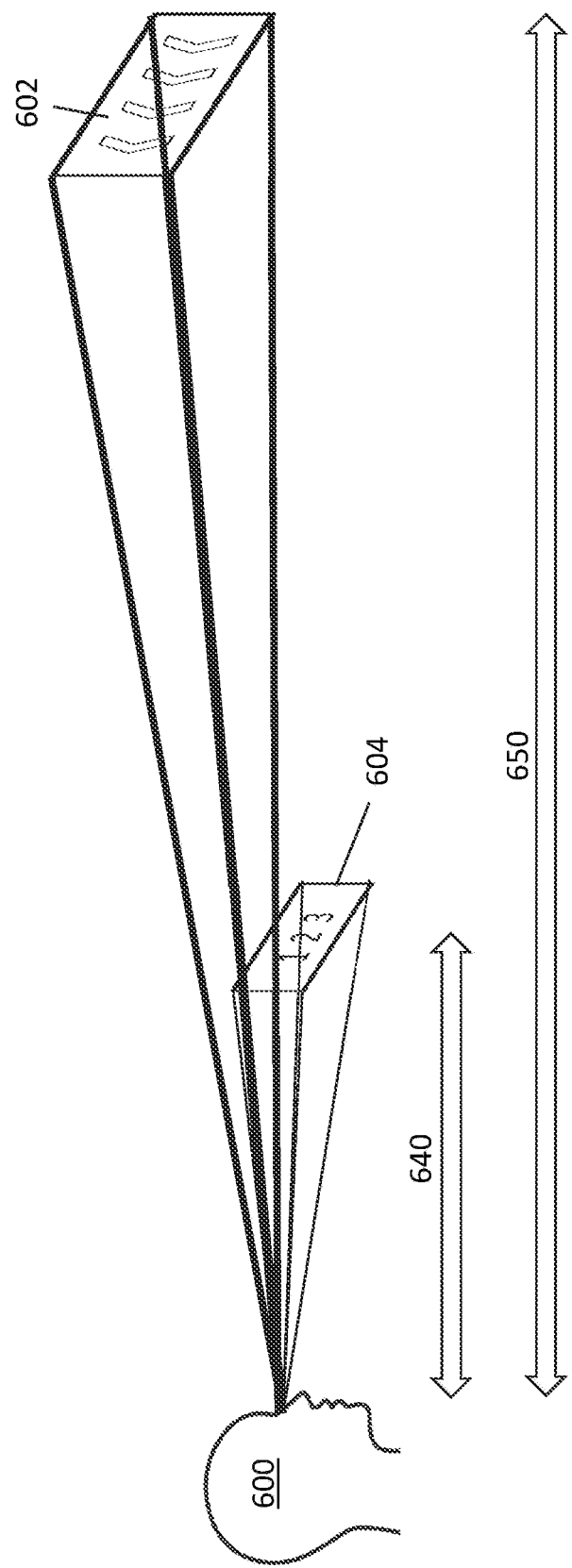
FIG. 6 represents the primary operating mode of embodiments.
Figure 7:
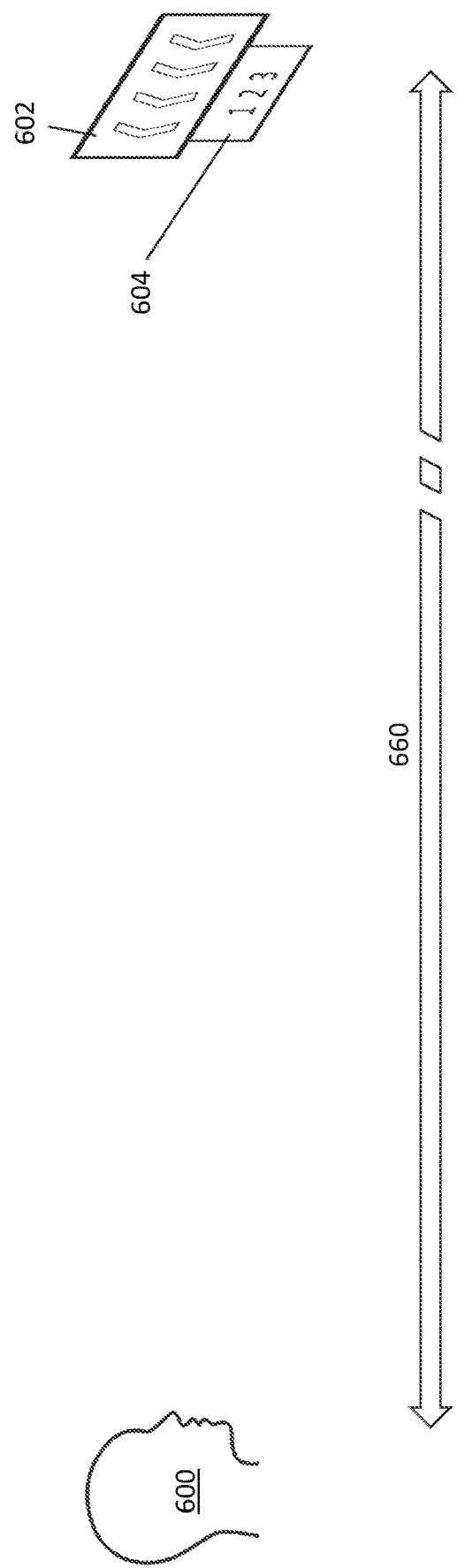
FIG. 7 represents the secondary operating mode of embodiments.

FIG. 5 shows a perspective view of a system 500 comprising two replicators, 504, 506 arranged for expanding a light beam 502 in two dimensions.

In the system 500 of FIG. 5, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5 combine to provide a two-dimensional replicator (or, "two-dimensional pupil expander").

Two-Dimensional Pupil Expansion—Example 2

British patent application GB2113454.9, filed 21 Sep. 2021 and incorporated herein by reference, discloses an image projector comprising a more advanced two-dimensional pupil expander may which be arranged in accordance with this disclosure.

The image projector may be arranged to project a diverging or diffracted light field. In some embodiments, the light field is encoded with a hologram. In some embodiments, the diffracted light field comprises diverging ray bundles. In some embodiments, the image formed by the diffracted light field is a virtual image.

In some embodiments, the first pair of parallel/complementary surfaces are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of parallel surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In some embodiments, the display system comprises a display device—such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted or diverging light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field—including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

Combiner Shape Compensation

An advantage of projecting a hologram to the eye-box is that windscreen compensation can be encoded in the hologram (see, for example, European patent 2936252 incorporated herein by herein). The present disclosure is particularly synergistic with holograms that compensate for the complex curvature of an optical combiner. Full details of this approach are provided in European patent 2936252 and are not repeated here because the detailed features of those systems and methods are not essential to the new teaching of this disclosure herein and are merely exemplary of configurations that significantly benefit from the teachings of the present disclosure.

Control Device

The present disclosure is also particularly synergistic with optical configurations that include a control device (e.g. light shuttering device) to control the delivery of light from a light channeling hologram to the viewer. The holographic projector may further comprise a control device arranged to control the delivery of angular channels to the eye-box position. British patent application 2108456.1, filed 14 Jun. 2021 and incorporated herein by reference, discloses the at least one waveguide pupil expander and control device. The reader will understand from at least this prior disclosure that the optical configuration of the control device is fundamentally based upon the eye-box position of the user. It may be said that the control device is a light shuttering or aperturing device. The light shuttering device may comprise a 1D array of apertures or windows, wherein each aperture or window independently switchable between a light transmissive and a light non-transmissive state in order to control the deliver of hologram light channels, and their replicas, to the eye-box. Each aperture or window may comprise a plurality of liquid crystal cells or pixels.

Virtual Image Distance

In a primary or first operating mode, the image projector is arranged to display image content in a far-field area 602 and a near-field area 604. The far-field area 602 and near-field area 604 may each be a planar area which is generally perpendicular to the projection axis. The far-field area 602 may be substantially parallel to the near-field area 604. The far-field area 602 may be defined by a far-field virtual image distance 650 which is a perpendicular distance from the user to the far-field area 602. The far-field virtual image distance may be 10 metres, for example, and may be used to present navigation indicators such as arrows. The near-field area 604 may be defined by a near-field virtual image distance 640 which is a perpendicular distance from the user to the near-field area 604. The far-field virtual image distance may be 2 metres, for example, and may be used to present driver information such as speed or battery life. In this operating mode, the far-field virtual image distance 650 is different to the near-field virtual image distance 640. More specifically, in the example illustrated, the far-field virtual image distance 650 is greater than the near-field virtual image distance 640. In the primary operating mode, the far-field virtual image distance 650 and near-field virtual image distance are both finite (i.e. not infinite).

The person skilled in the art of holography will understand from at least GB 2112213.0 and GB 2101666.2 that the virtual image distance is encoded in the hologram.

In some embodiments, a single hologram reconstructs image content in the far-field virtual image area 602 and near-field virtual image area 604. It may be said that the far-field virtual image distance 650 and near-field virtual image distance 640 are both encoded in the hologram by virtue of the method of calculation. For example, this single hologram may be a point cloud hologram. In other embodiments, a first (far-field) hologram corresponding to the far-field area 602 and a second (near-field) hologram corresponding to the near-field area 604 are calculated. The first and second hologram may be displayed at the same time (using an approach similar to "spatially-separated colours" described below) or consecutively in time (using an approach similar to "frame sequential colour" described below).

In a secondary or second operating mode, the image projector is arranged to display the image content of the far-field area 602 and the image content of the near-field area 604 at infinity. The virtual image distance 660 (for both sets of image content) is infinity. The reader will understand that this may involve recalculating the hologram, or first and second holograms, based on an infinite virtual image distance.

The first mode may be the preferred mode during normal operation. The second mode may be utilised if a user-tracking system (e.g. eye-tracking system) cannot determine the user's position with sufficient accuracy.

The inventor recognised that in some embodiments—in particular, those using the two-dimensional pupil expander of example 2 and a light channeling hologram—the display system is far more sensitive to eye-box position when the virtual image distance is finite (rather than infinite). That is, the quality of the images perceived is heavily dependent on the accuracy or faithfulness of the eye-box position used to calculate the corresponding hologram/s. There is therefore disclosed herein a method of projector that switches to an infinite virtual image distance if confidence in the eye-box position is low. If confidence in the eye-box position increases (above a threshold value), finite virtual image distances may be used again. The disclosed method therefore uses the first operating mode if the user-tracking data is good and the second operating mode if the user-tracking data is suspect or poor. The method improves the user's visual experience by exclusively using virtual image distances when confidence in the user-tracking information is not high.

Additional Features

In embodiments, the image is colour. In examples disclosed herein, three different colour light sources and three corresponding SLMs are used to provide a composite colour picture. These examples may be referred to as spatially-separated colour, "SSC". In a variation encompassed by the present disclosure, the colours are displayed on different area of the same SLM and then combining to form the composite colour image. However, the skilled person will understand that at least some of the devices and methods of the present disclosure are equally applicable to other methods of providing composite colour holographic images.

One of these methods is known as Frame Sequential Colour, "FSC". In an example FSC system, three lasers are used (red, green and blue) and each laser is fired in succession at a single SLM to produce each frame of the video. The colours are cycled (red, green, blue, red, green, blue, etc.) at a fast-enough rate such that a human viewer sees a polychromatic image from a combination of the images formed by three lasers. For example, in a video at 25 frames per second, the first frame would be produced by firing the red laser for 1/75th of a second, then the green laser would be fired for 1/75th of a second, and finally the blue laser would be fired for 1/75th of a second. The next frame is then produced, starting with the red laser, and so on.

An advantage of FSC method is that the whole SLM is used for each colour. This means that the quality of the three colour images produced will not be compromised because all pixels of the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced. Embodiments utilise the improved SSC technique disclosed in British patent 2,496,108 which is hereby incorporated in its entirety by reference.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

The methods and processes described herein may be embodied on a computer-readable medium and executed by one or more processors. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine (or one or more processors thereof) such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. A display system comprising an eye-box from which virtual images formed by the display system are visible, the display system comprising:
   an image projector arranged to project a virtual image at a virtual image distance from the eye-box; and
   a user-tracking system arranged to determine an eye-box position of a user within the eye-box and a confidence value associated with the determined eye-box position, wherein the image projector is arranged to (i) project the virtual image at a finite virtual image distance after determining that the confidence value is above a threshold value and (ii) project the virtual image at an infinite virtual image distance after determining that the confidence value is below the threshold value.

2. The display system of claim 1, wherein the image projector comprises a holographic projector, wherein the holographic projector comprises a spatial light modulator arranged to display a hologram of the virtual image and spatially modulate light in accordance with the hologram, wherein the virtual image distance is encoded in the hologram.

3. The display system of claim 2, wherein the hologram comprises a computer-generated hologram calculated by a hologram engine of the display system, wherein hologram calculation is based on the determined eye-box position.

4. The display system of claim 3, wherein the hologram calculation is based on the determined eye-box position when the image projector is arranged to project the virtual image at an infinite image distance.

5. The display system of claim 3, wherein the determined eye-box position is used to determine a sub-area of an optical combiner used to form the virtual image, and wherein the hologram engine is arranged to compensate for a shape of the optical combiner in the sub-area during hologram calculation.

6. The display system of claim 3, wherein the determined eye-box position is used to determine the position of an aperture in the display system, and wherein the hologram engine is arranged to exclude from the hologram calculation a contribution of light blocked by the aperture.

7. The display system of claim 3, wherein the hologram is configured to angularly distribute spatially modulated light of the image in accordance with a position of image content, such that angular channels of the spatially modulated light correspond with respective continuous regions of the image, wherein the holographic projector further comprises:
   at least one waveguide pupil expander arranged to form an array of replicas of the hologram; and
   a control device arranged to control a delivery of angular channels to the eye-box position.

8. The display system of claim 1, wherein the user-tracking system is arranged to repeatedly determine the eye-box position of a user during display of the virtual images.

9. The display system of claim 1, wherein the image projector is arranged to transition from projection at an infinite virtual image distance to projection at a finite virtual image distance in response to the confidence value increasing above the threshold, wherein the transition comprises projecting at an intermediate virtual image distance.

10. The display system of claim 1, wherein the confidence value is zero when no eye-box position can be established and the threshold value is greater than zero.

11. A method performed by a display system, the method comprising:
projecting a virtual image at a virtual image distance from an eye-box;
determining an eye-box position of a user within the eye-box and a confidence value associated with determination of the eye-box position;
projecting the virtual image at a finite virtual image distance after determining that the confidence value is above a threshold value; and
projecting the virtual image at an infinite virtual image distance after determining that the confidence value is below the threshold value.

12. The method of claim 11, the method further comprising:
calculating a hologram of the virtual image;
displaying the hologram on a spatial light modulator; and
spatially modulating light in accordance with the hologram, wherein the virtual image distance is encoded in the hologram.

13. The method of claim 12, wherein calculating the hologram is based on the eye-box position.

14. The method of claim 13, the method further comprising:
determining a sub-area of an optical combiner used to form the virtual image using the determined eye-box position; and
compensating for a shape of the optical combiner in the sub-area during hologram calculation.

15. The method of claim 13, further comprising:
determining a position of an aperture in the display system; and
excluding a contribution of light ray paths blocked by the aperture from the hologram calculation.

16. The method of claim 13, wherein the hologram is configured to angularly distribute spatially modulated light of the image in accordance with a position of image content, such that angular channels of the spatially modulated light correspond with respective continuous regions of the image, wherein the display system comprises a holographic projector, wherein the holographic projector further comprises at least one waveguide pupil expander arranged to form an array of replicas of the hologram and therefore an array of replicas of the angular channels, and wherein the method further comprises:
using a control device to control a delivery of angular channels to the eye-box position such that some angular channels are allowed to propagate to the eye-box and other angular channels are blocked from propagating to the eye-box.

17. Tangible, non-transitory computer-readable media comprising program instructions stored thereon, wherein the program instructions, when executed by one or more processors, cause a display system to perform functions comprising:
projecting a virtual image at a virtual image distance from an eye-box;
determining an eye-box position of a user within the eye-box and a confidence value associated with determination of the eye-box position;
projecting the virtual image at a finite virtual image distance after determining that the confidence value is above a threshold value; and
projecting the virtual image at an infinite virtual image distance after determining that the confidence value is below the threshold value.

18. The tangible, non-transitory computer-readable media of claim 17, wherein the functions further comprise:
calculating a hologram of the virtual image;
displaying the hologram on a spatial light modulator; and
spatially modulating light in accordance with the hologram, wherein the virtual image distance is encoded in the hologram.

19. The tangible, non-transitory computer-readable media of claim 18, wherein calculating the hologram is based on the eye-box position, and wherein the functions further comprise:
determining a sub-area of an optical combiner used to form the virtual image using the determined eye-box position; and
compensating for a shape of the optical combiner in the sub-area during hologram calculation.

20. The tangible, non-transitory computer-readable media of claim 18, wherein calculating the hologram is based on the eye-box position, and wherein the functions further comprise:
determining a position of an aperture in the display system; and
excluding a contribution of light ray paths blocked by the aperture from the hologram calculation.

* * * * *